United States Patent [19]

Sano

[11] Patent Number: 4,711,167

[45] Date of Patent: Dec. 8, 1987

[54] FRUIT JUICE SQUEEZER

[75] Inventor: Takashi Sano, Tokyo, Japan

[73] Assignee: Pigeon Corp., Tokyo, Japan

[21] Appl. No.: 769,689

[22] Filed: Aug. 27, 1985

[30] Foreign Application Priority Data

Sep. 10, 1984 [JP] Japan .............................. 59-136246[U]
Sep. 10, 1984 [JP] Japan .................................. 59-188061

[51] Int. Cl.⁴ ............................................... A23N 1/00
[52] U.S. Cl. ......................................... 99/510; 99/509; 241/86; 241/169.1
[58] Field of Search .......................... 99/495, 509–513, 99/537, 540, 501, 504, 565; 241/33, 168, 88, 169.1, 101 B, 98, 86, 87; D7/47–49

[56] References Cited

U.S. PATENT DOCUMENTS

| 879,440 | 2/1908 | Carothers | 99/540 |
| 2,109,048 | 2/1938 | Lorenzen | 99/512 |
| 2,906,195 | 9/1959 | Zysset | 99/509 X |

Primary Examiner—Timothy F. Simone
Attorney, Agent, or Firm—Wegner & Bretschneider

[57] ABSTRACT

A fruit juice squeezer is disclosed for obtaining fruit juice from fruit by pressing and cutting, which includes: a squeezer body having a reservoir means for storing said fruit juice, a handle rotatable with respect to said body, and mincer means comprising a perforated plate fixed to said body and a cutter disposed adjacent to said perforated plate and fixed to said handle and filter means comprising a mesh member fixed to a perforated plate, and a sliding member rotatably engaged with said mesh member and fixedly fitted into said handle, and are operable by turning of said handle.

5 Claims, 15 Drawing Figures 4,711,167

FRUIT JUICE SQUEEZER

FIELD OF THE INVENTION

The present invention relates to a fruit juice squeezer or press.

BACKGROUND OF THE INVENTION

To obtain fruit juice, there has generally been used a method designed to squeeze fruit juice from fruit, while the fruit is pressed to a squeezer or press, as a convenient one.

However, the foregoing method poses some problems such as scattering of fruit juice to the outside of the squeezer or overflowing thereof, and offers a sanitary problem, since the fruit should be kept by the hand. In addition, the seedcase, etc. may possible be contained in the fruit juice. Thus, the prior art press is unsuitable for the case where it is intended to obtain lees-free fruit juice for babies in the weaning period.

SUMMARY OF THE INVENTION

A main object of the present invention is to provide a novel fruit juice squeezer or press, which is free from the aforesaid problems.

BRIEF DESCRIPTION OF THE DRAWING

The foregoing and other objects of the present invention will become apparent from the following detailed description with reference to the accompanying drawings, which are given for the purpose of illustration alone.

DESCRIPTION OF THE PREFERRED EMBODIMENTS

The present invention will now is explained in detail with reference to the first embodiment of the present invention.

Figure 1:
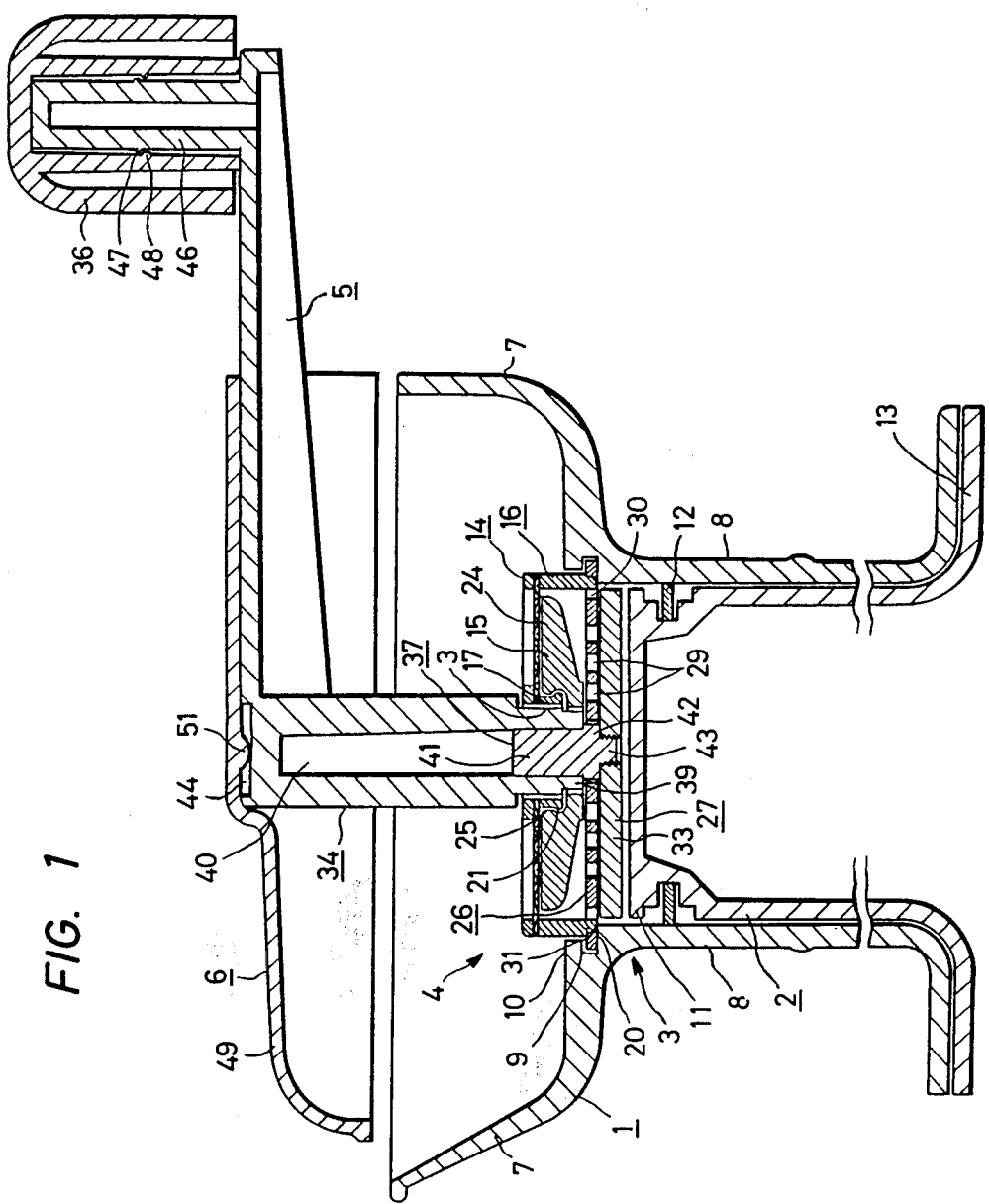
FIG. 1 is a sectional view, partly longitudinally cut-out, of the first embodiment of the fruit juice squeezer according to the present invention.

Referring to FIG. 1 which is a sectional view of a fruit juice press or squeezer, a press or squeezer body shown generally at 1 includes a fruit loading means 2 insertable thereinto, a fruit mincer means 3 mounted therein for mincing fruit into the given size, a filter means 4 mounted therein for obtaining fruit juice from the minced fruits, a handle means 5 for fitting into the mincer means 3 and filter means 4 to put them into operation, and a covering or lid means 6 which is detachably attached to the handle means 5.

The body 1 is provided with a fruit juicer reservoir means 7 and a fruit receiving means 8 in the cylindrical form. The means 7 is provided in the lower periphery with a groove 9, above which inwardly projecting stopper pieces 10 are formed at the predetermined intervals. The fruit loading means 2 is designed to be insertable through the fruit receiving means 8, and includes a plate 11 adapted to receive fruits on its upper face, a packing 12 mounted therebelow, and sidewise extensions 13 at its lower end, said extensions being adapted to be placed on a table, etc.

Figure 2:
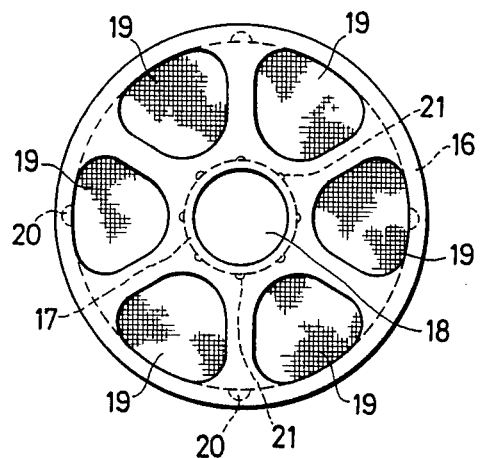
FIGS. 2 and 3 are views illustrative of the mesh member.
Figure 3:
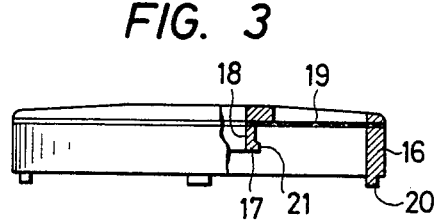

The filter means 4 comprises a mesh member 14 and a sliding member 15. As illustrated in FIGS. 2 and 3, a partly cut-away sectional view, the mesh member 14 is provided on the outside with a cylidrical outer wall and on the inside with a cylindrical inner wall 17 which is shorter than the outer wall 16. The inner wall 17 is formed on the inside with an axial hole 18 into which a round step 38, to be described later, of the handle means 5 is to be loosely fitted. Between the outer wall 16 and the inner wall 17 there is interposed a filter 19 of such a mesh size that allows fruit juice to pass therethrough but does not permit penetration of juice extracts. The outer wall 16 is provided at the lower end face with a semi-circular projection 20, while the inner wall 17 is formed at its lower end with a projection 21, by which the sliding member 15 is rotatably supported.

Figure 4:
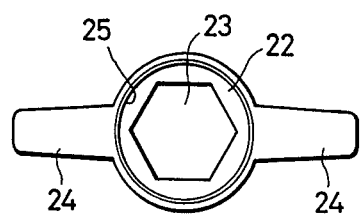
FIGS. 4 to 8 are views illustrative of the sliding member.
Figure 5:
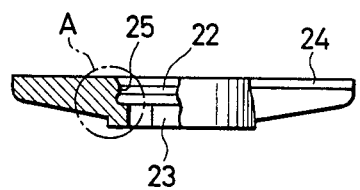
Figure 6:
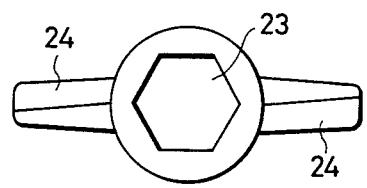
Figure 8:
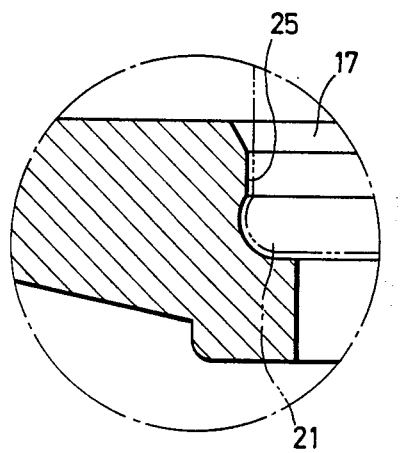
Figure 7:
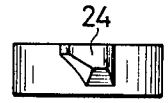

As illustrated in the plan view of FIG. 4, the partly cut-away side veiw of FIG. 5, the bottom view of FIG. 6, the side view of FIG. 7 and the enlarged view of FIG. 8 in which the region A in FIG. 5 is shown, the sliding member 15 is formed in the center with a circular inner wall hole 22 into which the inner wall 17 is to be fitted. That member 15 is also provided therein with a hexagonal hole 23 adapted to communicate with the hole 22. The holes 22 and 23 are provided on their outsides with tapering-off sliding pieces 24, each of a substantially conical shape. An annular projection 25 is fitted into the inner wall hole 22, and is adapted to engage with the projection 21 of the inner wall 17, whereby the sliding member 15 is rotatably supported by the mesh member 14. In the hexagonal hole 23, there is fitted a hexagonal step 39 of the handle 5 to be described later.

Figure 9:
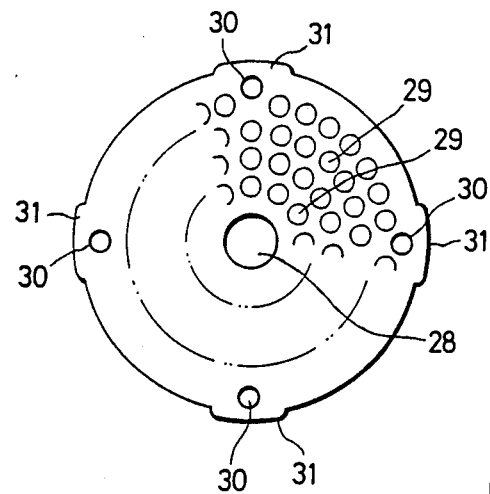
FIG. 9 is a view illustrative of the perforated plate.
Figure 10:
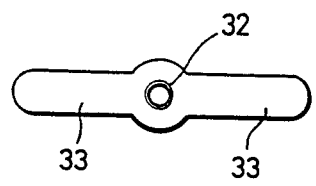
FIG. 10 is a view illustrative of the cutter.

The mincer means 3 comprises a perforated plate 26 and a cutter 27. As illustrated in the plan view of FIG. 9, the perforated plate 26 is provided in the central portion with an axial opening 28 of the round form, into which a screw is to be loosely fitted in the manner to be described later, and with a number of holes 29, each having a diameter such that flesh overflows therethrough, say, 3 to 6 mm. The mincer means 3 is provided with round holes 30 in the vicinity of the outer portion, within which the projections 20 of the mesh member 14 are engaged to secure the mesh member 14 to the perforated plate 26. Further, the perforated plate 26 is provided on the outside with projecting pieces 31 in the arcuated form at given intervals, which are engaged within the groove 9 in the squeezer body 1 to secure the perforated plate 26 to the squeezer body 1 by the stopper pieces 10. As illustrated in the plan view of FIG. 10, the cutter 27 is formed therein with a tapped hole 32, within which a screw 37 is to be engaged in the manner as described later, and includes cutting blades 33 which rotate below the perforated plate 26 to cut off flesh.

Figure 11:
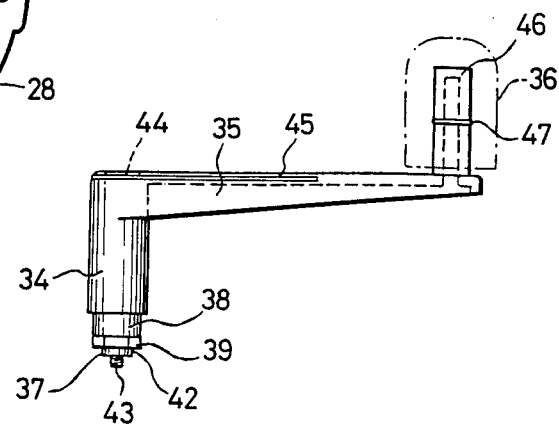
FIGS. 11 and 12 are view illustrative of the handle.
Figure 12:
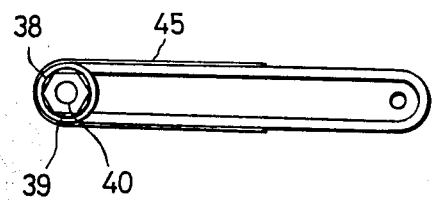
Figure 13:
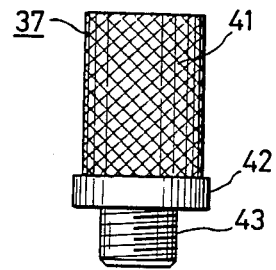
FIG. 13 is a view illustrative of the screw.

As illustrated in the side view of FIG. 11 and the bottom view of FIG. 12, the handle 5 includes a rotary shaft 34 and a crank 35 in one united body, as well as a knob 36 rotatably mounted on the crank 35 and a screw 37 fitted under pressure into the rotary shaft 34. The rotary shaft 34 is provided at the lower portion with a round step portion 38 and a hexagonal step portion 39, said round step 38 being designed to be loosely fitted into the axial hole 18 in the mesh member 14 so as to keep the mesh member 14 from rotating, even when the rotary shaft 34 rotates. The hexagonal step portion 39 is also designed to be fitted into the hexagonal hole 23 in the sliding member 15, whereby the sliding member 15 is rotated together with the rotation of the rotary shaft 34. The rotary shaft 34 is formed with a tapped hole 40 of the round form in the axial direction, said hold being open at the bottom face. A screw 37 is fitted under pressure into the tapped hole 40. As illustrated in the enlarged front view of FIG. 13, the screw 37 is comprised of a knurled portion 41, a round shaft 42 having a diameter larger than that of the perforated plate 26, and an externally threaded portion 43. The knurled portion 41 is inserted under pressure into the tapped hole 40, so that the screw 37 is fixed to the rotary shaft 34 for rotation therewith. The round shaft 42 is loosely fitted into the axial hole 28 in the perforated plate 26, so that, even when the screw 37 rotates, the perforated plate 26 is prevented from rotating. The externally threaded protion 43 is in threaded engagement within the tapped hole 32 in the cutter 27, and the cutter 27 is designed to be rotated with the screw 37, while the handle 5 is mounted on the squeezer body 1 through the perforated plate 26. It is noted that the rotary shaft 34 is provided on the upper end face with a round recess 44 into which the projection 51 of the lid is to be fitted.

The crank 35 in the U-shaped form which is open at the lower end, and is provided on the side upper portion with a projection 45 which extends from one end to a position corresponding to the periphery of the reservoir means 7. The crank 35 is also provided at the other end with a knob shaft 46 on which the knob 36 is rotatably mounted by engagement of its associated projections 47 and 48.

Figure 14:
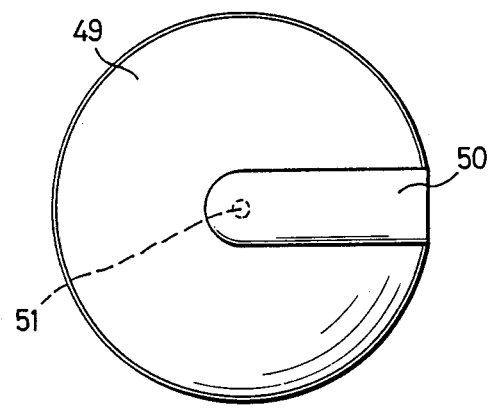
FIGS. 14 and 15 are views illustrative of the lid.
Figure 15:
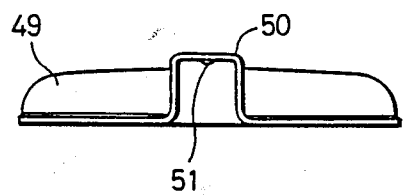

As shown in the plan view of FIG. 14 and the side view of FIG. 15, the lid 6 is formed with an inverted, shallow portion 49 in the bowl form, which is designed to cover substantially the upper face of the reservoir means 7. The lower end of the outer periphery of the bowl-like portion 49 is located above the upper end of the outer periphery of the reservoir means 7 at a slight interval. A crank-accommodating portion 50 is in the U-shaped form which is open at the lower portion, and extends from the central portion to the outside of the lid 6. That portion 50 is also provided with a projection 51 on the inner wall of the upper portion thereof. The crank 35 is fitted into the crank-accommodating portion 50 with fitting of the projection 51 into the recess 44, whereby the lid 6 is fixedly placed on the handle 5.

In assembling such a fruit juice press, the inner wall 17 of the mesh member 14 is inserted into the hole in the inner wall 22 of the sliding member 15 with the projection 21 being engaged with the projection 25, so that the sliding member 15 is rotatably mounted on the mesh member 14. Then, after the perforated plate 26 is set in the groove 9 in the press body 1, it is turned into a position below the the stopper pieces 10, so that the perforated plate 26 is held on the press body 1. The mesh member 14 and the sliding member 15 constructed as one united body are placed on the perforated plate 26 held on the press body 1, and the projection 20 of the mesh member 14 is fixedly fitted into the hole 30 in the perforated plate 26. In this state, the rotary shaft 34 having the screw 37 fitted thereinto is then inserted through the axial hole 18, the hexagonal hole 23 and the axial hole 28, and the threaded portion 43 projecting from the perforated plate 26 is threadedly engaged within tapped hole 32 of the cutter 27. In this manner, the mesh member 14, the sliding member 15, the perforated plate 26, the cutter 27 and the handle 5 are integrally held in the press body into a fruit juice press.

Reference will now be made to the method for pressing or squeezing fruit juice. First of all, the lid 6 is pressed to the handle 5 from above, and the crank 35 is fitted under pressure into the crank-accommodating portion 50 to secure the lid 6 to the handle 5. Then, fruit such as orange is placed on the plate 11 in the fruit-receiving means for accommodation 8, and the handle 5 is turned, while pressing the squeezer body 1 to the fruit loading means 2. A space between the cutter 27 and the plate 11 is of course initially provided for accommodating the whole fruit. When the squeezer body 1, more specifically the cutter 27, is pressed onto the fruit towards the plate 11, the fruit loading means 2 moves upwards thereby further squeezing the fruit. Thereupon, flesh is pressed out of the holes 29, and is cut off by means of the cutter 27, whereby the fruit juice is separated from the seedcase. The fruit juice passes through the mesh member 14, and is stored in the reservoir 7. A portion of the fruit juice running out of the reservoir means 7. A portion of the fruit juice running out of the reservoir means 7 is designed to strike upon the bowl-like portion 49 of the lid 6 which rotates in unison with the handle 5 and covers the reservoir means 7. The seedcase is hindered by the mesh member 14, and is removed from the fruit juice. At this time, since the sliding member 15 is slid on the surface of the mesh member 14 by turning of the handle 5, a portion of the seedcase remaining on the surface of the mesh member 14 is removed, thereby to prevent the mesh member 14 from being clogged.

Since the fruit juice squeezer or press of the present invention is constructed and used in the manner as described above, it is possible to store the obtained fruit juice as such. This is because the reservoir means is covered with the lid, when passing the fruit juice, thus eliminating the possibilities of scattering or overflowing of the fruit juice, or allowing dust to enter the fruit juice. In addition, since it is possible to obtain only fruit juice from fruit with easiness, the squeezer or press of the present invention can sanitarily be employed.

What is claimed is:

1. A fruit juice squeezer for obtaining fruit juice from fruit by pressing and cutting, comprising:
    a squeezer body having a reservoir means for storing said fruit juice;
    a handle rotatable with respect to said body;
    mincer means being operable by the turning of said handle and filter means being fixed to said squeezer body, wherein said mincer means comprises a cutter means connected to said handle for rotational movement coaxial with said filter means; and
    a fruit loading means axially movably disposed adjacent said cutter means for accommodating said fruit to be squeezed, and wherein said fruit loading means moves towards said cutter means when said squeezer is in operation.

2. A squeezer as claimed in claim 1, in which said mincer means includes a perforated plate fixed to said body and a cutter disposed adjacent to said perforated plate and fixed to said handle.

3. A squeezer as claimed in claim 1, in which said filter means includes a mesh member fixed to a perforated plate, and a sliding member rotatably engaged with said mesh member and fixedly fitted into said handle.

4. A squeezer as claimed in claim 1 wherein said cutter means is located below said mincer and filter means and said fruit loading means moves upwards towards said cutter means when said squeezer is in operation.

5. A fruit juice squeezer including a squeezer body, a handle rotatable with respect to said body, a filter means comprising a mesh member and a sliding member, and a mincer means comprising a disk-like perforated plate and a cutter, in which:

said mesh member is loosely fitted onto a rotary shaft of said handle, and being provided on the end of a cylidrical outer wall with a projection which is engaged within an opening in said perforated plate so that said mesh member is fixed to said perforated plate, said perforated plate being loosely fitted onto a screw fitted under pressure into the end of the rotary shaft of said handle, and being provided on the outer periphery with a projection which is engaged within an opening in said body, so that said perforated plate is fixed to said body, and said cutter being in threaded engagement with said screw.

* * * * *